United States Patent [19]

Bruce

[11] Patent Number: 5,185,952
[45] Date of Patent: Feb. 16, 1993

[54] LURE STORAGE CONTAINER

[76] Inventor: Samuel E. Bruce, P.O. Box 1165, Crockett, Tex. 75835

[21] Appl. No.: 757,997

[22] Filed: Sep. 12, 1991

[51] Int. Cl.$^5$ ............................................. A01K 97/06
[52] U.S. Cl. .................................... 43/57.1; 43/54.1; 206/315.11
[58] Field of Search ......................... 43/54.1, 57.1; 206/315.11

[56] References Cited

U.S. PATENT DOCUMENTS

| | | | |
|---|---|---|---|
| 2,316,833 | 4/1943 | Baron | 43/57.1 |
| 2,711,050 | 6/1955 | McIntyre | 43/57.1 |
| 3,507,071 | 4/1970 | Bryson | 43/57.1 |
| 4,186,511 | 2/1980 | Slacter | 43/57.1 |
| 4,240,222 | 12/1980 | Covington | 43/57.1 |
| 4,770,327 | 9/1988 | Fortson | 43/54.1 |
| 4,780,982 | 11/1988 | Black | 43/54.1 |
| 4,829,699 | 5/1989 | Perkins | 43/54.1 |
| 4,936,044 | 6/1990 | Bruce | 43/57.1 |
| 4,947,577 | 8/1990 | Abbotoy | 43/57.1 |
| 5,054,669 | 10/1991 | Zimbardi | 43/57.1 |

Primary Examiner—Kurt C. Rowan
Attorney, Agent, or Firm—Harrison & Egbert

[57] ABSTRACT

A container for fishing lures having a box with a vertical receptacle positioned therein, a panel received by the vertical receptacle, and a lure receiving member in a horixontal slot on the vertical panel. The lure receiving member detachably receives a fishing lure. The box has a lid hinged thereto so as to be movable between an open position and a closed position. A handle is formed along one surface of the box and includes a suitable lock mechanism for locking the lid to the box. The panel is a flat member having a plurality of horizontal slots extending across the front side and the back side of the panel. The panel has a male connector formed along one edge of the panel and a female receiving slot formed on an opposite edge of the panel. The lure receiving member is a clip having a body, a first and second arm extending outwardly from the body, and a T-shaped member extending outwardly from the opposite side of the body. The T-shaped member engages the horizontal slots on the panel.

25 Claims, 8 Drawing Sheets

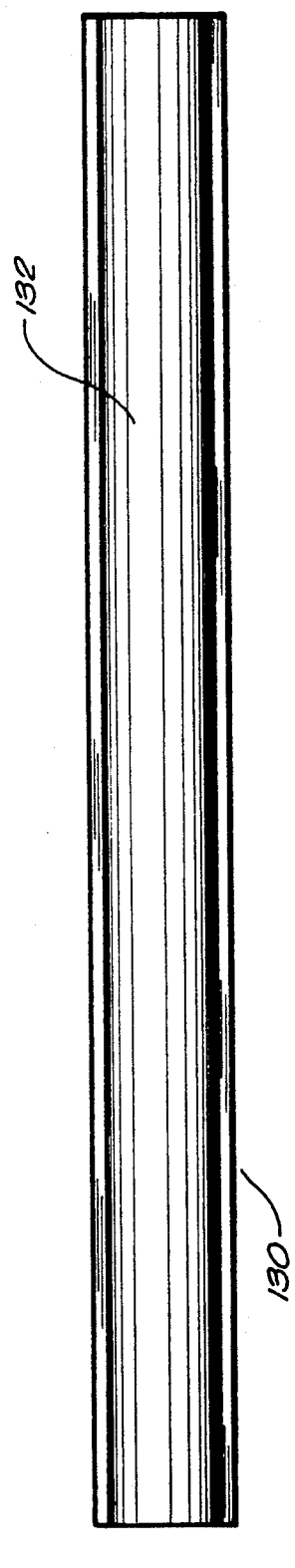
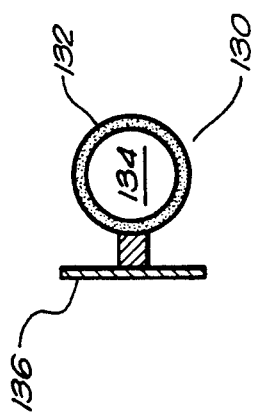
FIG. 12
FIG. 13

LURE STORAGE CONTAINER

TECHNICAL FIELD

The present invention relates to lure storage boxes. More particularly, the present invention relates to lure storage boxes having display panels contained therein.

BACKGROUND ART

The storage of fishing lures presents a continuing problem that afflicts many fisherman. There are a wide variety of fishing lures that are utilized by fisherman. The typical fisherman will encounter congealed masses of plastic worms, crusty jars of long-forgotten pork rind, dusty piles of other types of lures, and other assorted debris within the tackle box. The problem of the clean and efficient storage of lures and tackle is a goal that often escapes the fisherman.

The problem of lure storage becomes even more complicated when the fisherman uses a wide variety of crankbaits. Crankbaits are plastic molded "fish-like" lures which typically have two sets of treble hooks. Although the hooks are not magnetized, the hooks manage to interconnect and tangle up. It is only rarely that one is able to retrieve a crankbait from the storage compartment without having to perform a complicated procedure to free it from bondage. Every year the fishing industry produces greater varieties of crankbaits. Crankbait accumulation becomes a problem faced by fishermen. In competitive fishing events, it is of prime importance to have a variety of crankbaits available for efficient use during the competition.

There are many other problems that face anglers utilizing conventional storage systems. Any moisture that would accumulate in the flat box-like storage trays will cause a problem of rusty hooks. Whenever more than one lure is placed in an individual compartment in a typical storage tray, entanglement becomes a serious problem. Many fisherman utilize plastic worms as bait. When these plastic worms are placed into conventional storage systems, these plastic worms will convey a chemical reaction to lures in the storage box so as to ruin the paint on the crankbaits stored in the storage box. Rubber skirts often fuse to lures when exposed to excessive heat. The frictional movement of the lure within a conventional storage tray will diminish the finish of the lure. Since the finish of the lure is an important factor in attracting fish and catching such fish, it is important to maintain the quality of the finish on the lure, especially for crankbaits. In conventional storage systems, one must search through several boxes, unfold a complicated array of drawers, and carry out excessive manipulation in order to choose the proper lure. If the storage box is turned over or picked up without properly securing the lid of the storage box, the lures will become scattered and disorganized. It is often time consuming to orderly organize the lures. In horizontal drawer systems of storage, it is very inconvenient for the competitive fisherman to stoop over and access the storage box. Furthermore, as the inventory of lures grows, it becomes expensive to purchase additional storage boxes. In brief summary, the conventional storage systems that are available on the market do a poor job of tracking and preserving these lures.

In order to have an effective assortment of crankbaits, the crankbait fisherman should be prepared to maintain a supply of approximately seventy-two crankbaits. In competitive fishing, it is very important that the bass fisherman have a systematic selection of crankbaits capable of covering the various depths of which bass might hold: shallow, medium, and deep. Within these particular categories, the fisherman should have wide-wobbling plugs and narrow-wobbling lures and vibrating, lipless crankbaits. Each lure style should be represented in four basic color patterns: shad, chartreuse, gold and crawfish. In addition, the competitive fisherman should pack two of each kind of crankbait just in case a particularly productive crankbait is lost.

Although there are a wide variety of tackle boxes presently available, none of these tackle boxes present a vertical storage system for crankbaits. None of these systems effectively organizes the crankbaits in accordance with type, style, and depth. Most of these existing tackle boxes present horizontal storage systems, drawer storage, or unfolding slide styles of storage. As stated previously, none of these particular styles of tackle boxes are effective mechanisms for the use of crankbaits.

U.S. Pat. No. 4,936,044, issued on Jun. 26, 1990 to the present inventor, describes a lure storage container. This patent describes a container for fishing lures that has a box, a panel slidably positioned within the box, and a suitable lure receiving member that is slidably received within a plurality of horizontal slots in the panel. The box had a plurality of vertical slots formed therein for receiving the panel. The lure receiving member has a flat surface that is suitable for insertion into the horizontal bars fitted to the exterior of the panel. A circular clip was used which extended from the flat surface outwardly so as to engage a portion of the lure. A number of indentations were formed on the top surface of the slots within the box so as to receive the bottom edge of a panel for suitable display.

It is an object of the present invention to provide a lure storage container that allows crankbaits to be vertically displayed.

It is another object of the present invention to provide a lure storage container that effectively organizes the crankbaits.

It is still another object of the present invention to provide a lure storage container that maintains the finish on the stored lures.

It is still another object of the present invention to provide a lure storage container that is particularly adapted to the storage of crankbaits and other treble-hooked lures.

It is still another object of the present invention to prevent hook entanglement of the lures within the container.

These and other objects and advantages of the present invention will become apparent from a reading of the attached specification and appended claims.

SUMMARY OF THE INVENTION

The present invention is a container for fishing lures that comprises a box having a vertical receptacle formed therein, a panel received by the vertical receptacle in the box, and a lure receiving member that is received by a horizontal slot on the panel. The panel includes a plurality of slots integrally formed in the panel and extending across a portion of at least one surface of the panel. The lure receiving member serves to detachably receive a fishing lure.

The box has a lid which is hinged to an edge of the box. The lid is movable between an open and a closed position. The box has a handle which is formed along one surface of the box. The lid had a locking mechanism affixed thereto. The locking mechanism is suitable for engaging a portion of the handle when the lid is in a closed position. The handle has at least one receptacle formed thereon. The locking mechanism is a roughly V-shaped member affixed to a surface of the lid. A slidable insert is placed within the V-shaped member. This slidable insert is movable within the V-shaped member so as to cause the member to angularly expand for engagement with the receptacle of the handle. The box has a rigid back surface which is suitable for connection to a second box. The second box has a rigid back surface which is fastened to the rigid back surface of the first box. The second box has another lid which is movable between an open and a closed position. The second box can contain a tray having various fishing appliances.

The panel is a flat member of extruded plastic having a front side and a back side. This panel is removably contained within the box. Specifically, the panel has a male connector formed along one edge of the panel and a female receiving slot formed on an opposite edge of the panel. This configuration of male connector and female receiving slot allows separate panels to be joined together by engaging the male connector with the female slot. Each of the horizontal slots on the panel comprise a first T-shaped member and a second T-shaped member which is parallel to and spaced from the first T-shaped member. Each of the first and second T-shaped members are joined to a central surface. The T-shaped members extend outwardly from each side of the central surface.

The panel further includes a suitable attachment member that is fastened to the back side of the panel. This attachment member allows the panel to be attached to a surface exterior of the box. Specifically, this attachment member may comprise a suction cup (or a plurality of suction cups) which is received by one of the horizontal slots. The suction cup has a suction side that faces outwardly from the panel. The suction cup serves to fasten the panel to a surface exterior of the box. Other means can also be used to fasten the panel to an exterior surface.

The lure receiving member comprises a clip having a portion extending outwardly therefrom for slidably engaging one of the horizontal slots of the panel. This clip has a specific configuration that comprises a body, a first arm extending outwardly from one side of the body, a second arm extending outwardly from one side of the body, and a T-shaped member extending outwardly from the opposite side of the body. The first and second arms are aligned and in close proximity and define a receiving area therebetween. This receiving area is for connecting to a portion of a fishing lure. The T-shaped member extending outwardly from the body serves to engage one of the plurality of horizontal slots on the panel.

Alternatively, and in addition to the clip, the lure receiving member can further comprise a cushion bar that is slidably received by one of the horizontal slots. This cushion bar has a cushion surface extending outwardly from a surface of the panel. This cushion bar serves to separate the lure from the surface of the panel. A spool dispenser rod can also be slidably received by one of the horizontal slots on the panel. The spool dispenser rod extends outwardly from an edge of the panel for the purpose of receiving a spool of fishing line.

In an alternative embodiment of the present invention, the present invention can be a box having the slotted members fastened to a flat surface within the box. The lure receiving member is a clip which fastens to the slotted member within the box and extends perpendicularly outwardly relative to the back surface of the box. The box has a suitable lid for sealing the interior of the box. This can be scaled down in size to attach to interior surfaces such as on front of consoles, underside of strange lids, etc. It can be attached to exterior surfaces of other tackleboxes for temporary storage of lures in use.

BRIEF DESCRIPTION OF THE DRAWINGS

FIG. 12 is a frontal view of the cushion bar in accordance with the present invention.

FIG. 13 is an end view of the cushion bar of FIG. 14.

DETAILED DESCRIPTION OF THE INVENTION

Figure 1:
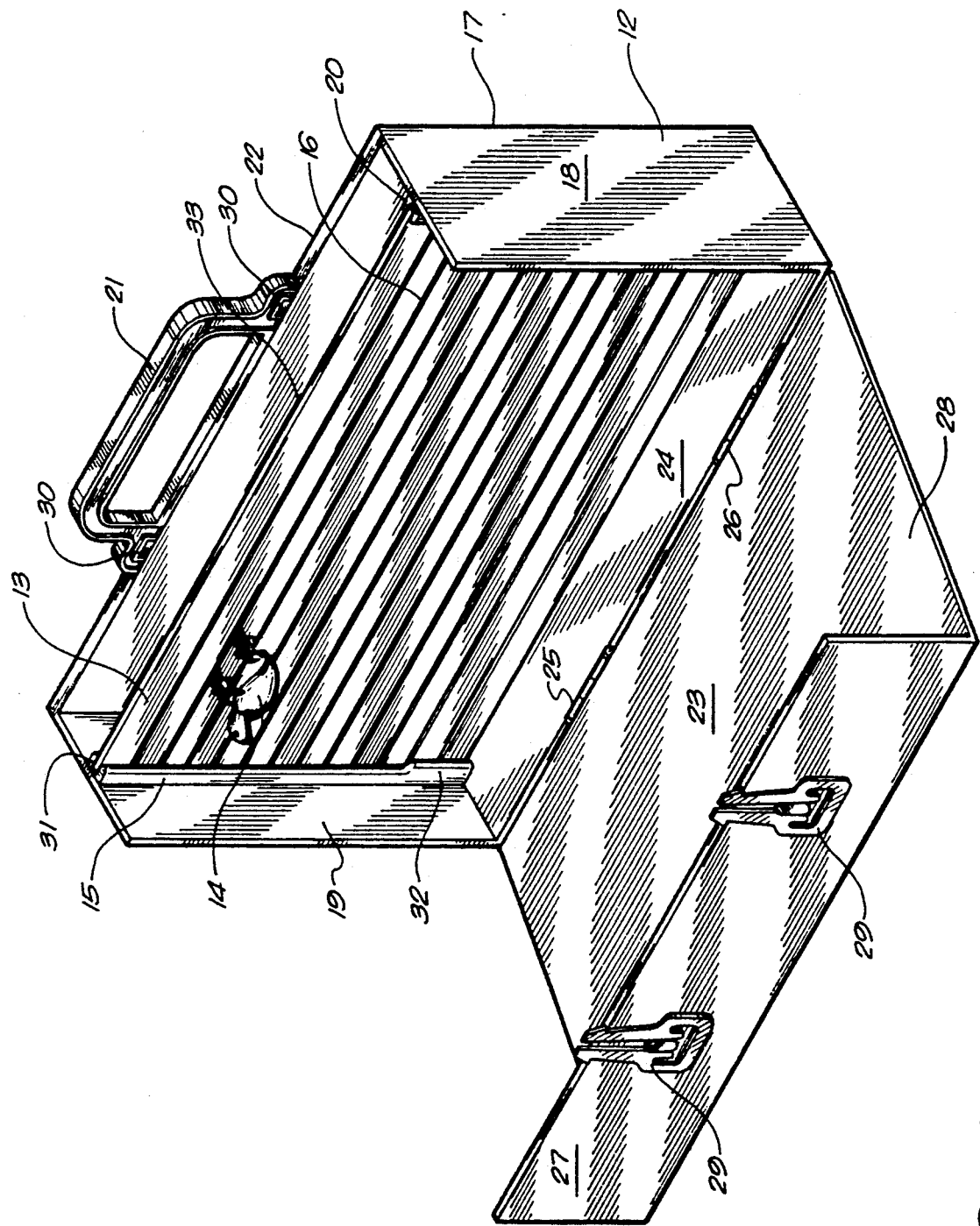
FIG. 1 is a perspective view showing the preferred embodiment of the lure storage container of the present invention.

Referring to FIG. 1, there is shown at 10 the lure storage container in accordance with the preferred embodiment of the present invention. Lure storage container 10 comprises a box 12, a panel 13, and a lure receiving member 14 (to be described in detail hereinafter). The panel 13 is slidably received within a vertical receptacle 15. As will be described hereinafter, the lure receiving member 18 is slidably received by one of the plurality of horizontal slots 16 positioned on the panel 13.

The box 12 has a back wall 17 and side walls 18 and 19. The side walls 18 and 19 extend perpendicularly at opposite ends of the back wall 17. It can be seen in FIG. 1 that the side wall 19 includes a vertical slot 15 that is formed on the interior surface of side wall 19. Similarly, a slot 20 extends vertically along the interior surface of side wall 18. These vertical slots 15 and 20 receive the panel 13 and maintain the panel 13 in a vertical position within box 12.

The back wall 17 is a rigid flat surface manufactured from a molded plastic material. A specially designed handle 21 extends upwardly above the upper edge 22 of back wall 17. Handle 21 is formed during the manufacture of the back wall 17. The side walls 18 and 19 may be integrally formed with the back wall 17 or they may be fastened to the back wall by appropriate means.

Figure 3:
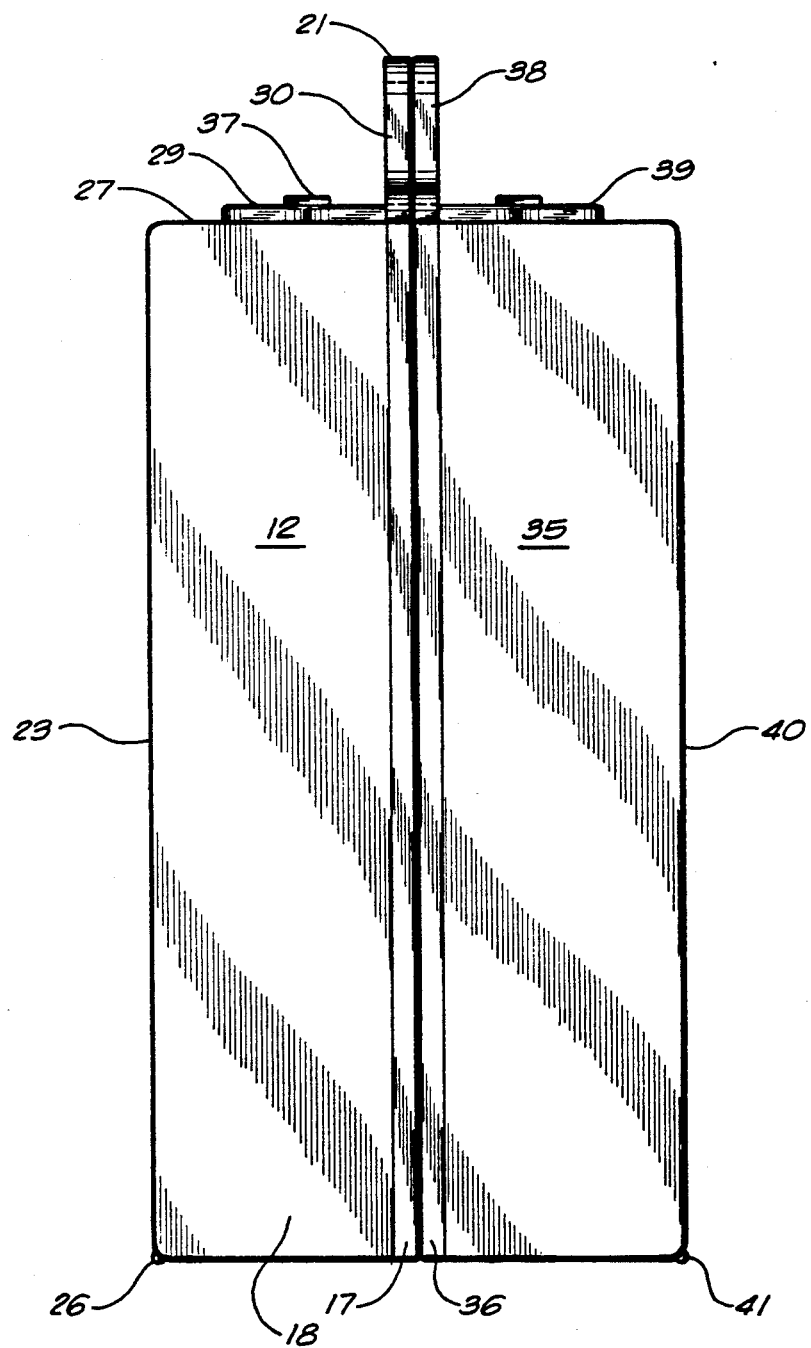
FIG. 3 is a side view of an alternative embodiment of the present invention showing the box as joined to another box to form a dual compartment lure storage container.
Figure 4:
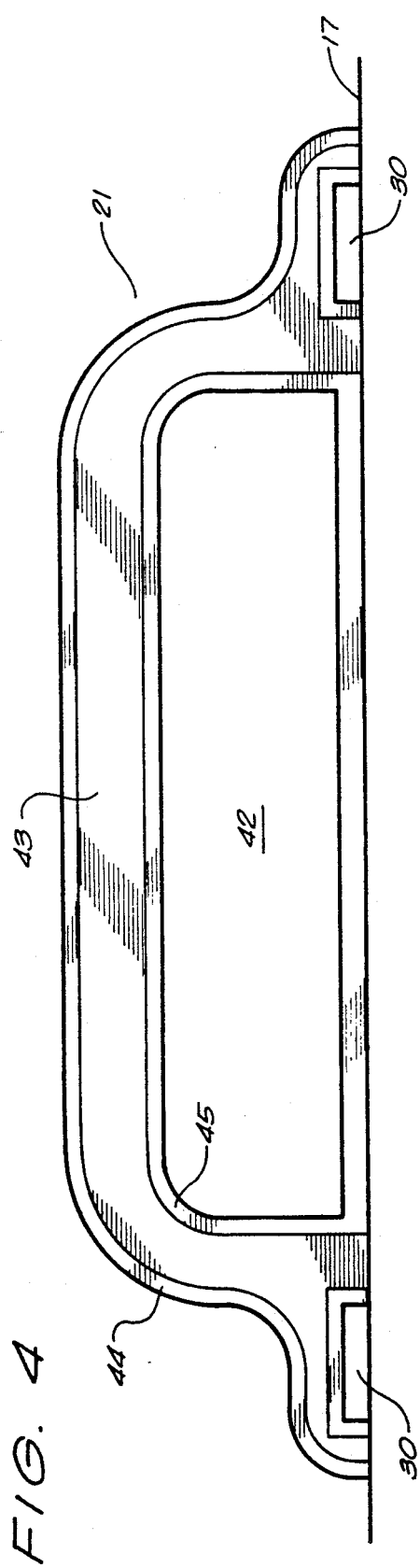
FIG. 4 is an isolated view showing the configuration of the handle of the box of the present invention.
Figure 5:
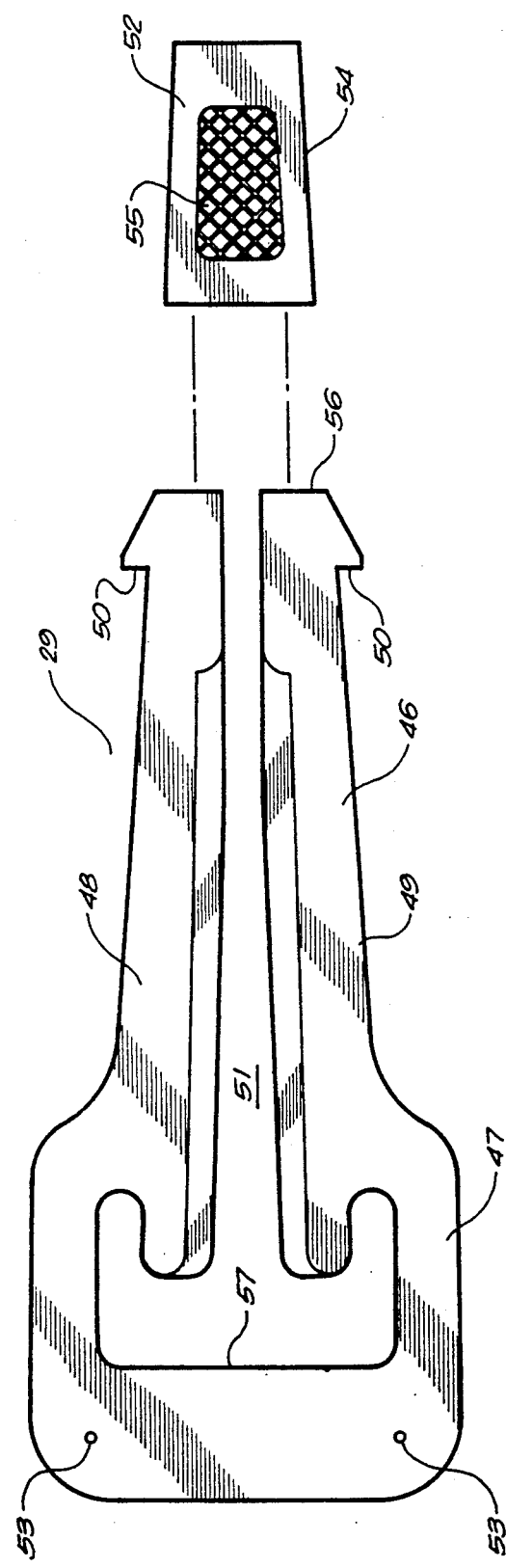
FIG. 5 is an exploded top view showing the arrangement of the locking mechanism of the lure storage container of the present invention.

A lid 23 is hingedly fastened to a bottom surface 24 of box 12. Specifically, lid 23 is fastened by hinges 25 and 26 to the forward edge of the bottom wall 24. The lid 23 is hinged so as to move between an open position (shown in FIG. 1) and a closed position (as shown in FIG. 3). Lid 23 has an end surface 27 extending generally perpendicular to the front wall surface 28 of lid 23. The end surface 27 receives the locking mechanism 29 thereon. Locking mechanism 29 is suitable for engaging the receptacles 30 on handle 21. A detailed description of the locking mechanism, and associated handle, is shown in FIGS. 4 and 5. The lid 23 is conventionally made of a transparent or translucent sheet of molded plastic. In the closed position, the lid 23 will still allow a viewing of any lures that are received by the lure receiving member 14 and displayed on the panel 13.

Of significance in FIG. 1, it can be seen that the lure vertical slots 15 and 20 act as a receptacle for the panel 13. After experimentation, it was found that it was generally difficult to remove and insert the panel 13 into a long narrow channel. As such the slots 15 and 20 have a special configuration. The back surface 31 of slot 15 extends along the height of the panel 13 and generally abuts a width-wise portion of the back surface of the panel 13. The forward surface 32 of slot 15 has a thickened portion at its bottom. The upper portion of the surface 32 allows the panel to be easily placed in abutment with the back surface 31. As the panel 13 is lowered into the slots 15 and 20, the thickened portion 32 of slot 15 will generally guide and receive the panel so that the panel is maintained in its upward position. A special sliding member can be placed along the top edge 33 of panel 13 so as to lock the panel 13 in proper position within slots 15 and 20. The sliding member can also be used to dispense line, as will be described hereinafter.

As a variation on the invention shown in FIG. 1, it remains possible to place the panel 13 in fixed relationship to the back wall 17 of box 12. When the panel 13 is affixed to the inner surface of back wall 17, the lures will only be available from the front surface of the panel 13. However, this can prove to be a desirable, and an alternative, way of transporting lures.

Also, and in addition, it is possible that various substitutes for the horizontal slots 16 on panel 13 can be achieved within the scope of the present invention. For example, the panel 13 can be a pegboard panel or a panel having keyed slots. Although the horizontal slots 16 are believed to be the preferred embodiment of the present invention, various changes in the panel 13 can be made within the scope of the present invention.

Figure 2:
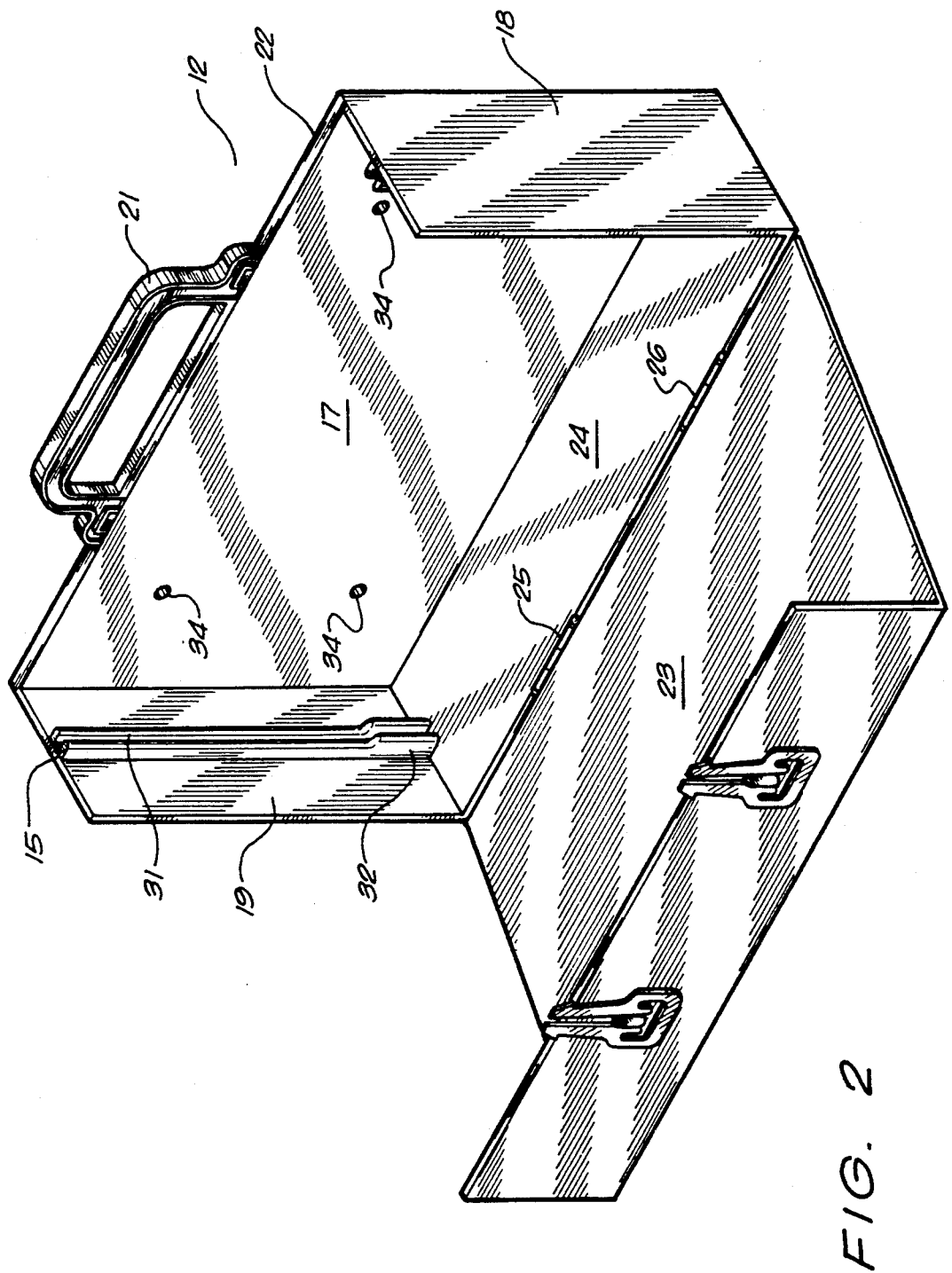
FIG. 2 is a perspective view of the box of the lure storage container of the present invention.

FIG. 2 shows a detailed view of the box 12. In FIG. 2, it can be seen that the box 12 has back wall 17 and side walls 18 and 19. The bottom wall 24 extends perpendicular to the back wall 17 and between the side walls 18 and 19. The lid 23 is suitably hinged to the bottom wall 24. Lid 24 rotates about hinges 25 and 26 so as to seal the interior of the box 12. The handle 21 is integrally formed with the back wall 17 and extends upwardly from the top edge 22 of back wall 17.

In FIG. 2, it can be seen, in particular, that the back wall 17 includes a plurality of openings 34. These openings 34 are suitable for fastening the back wall 17 to an exterior surface or for joining the back wall 17 to another box of a configuration similar to that of box 12. When the boxes are arranged in back-to-back relationship, the capabilities and carrying capacities of the box 12 of the present invention becomes greatly expanded. FIG. 2 also shows, in greater detail, the arrangement of slot 15. It can be seen that slot 15 is comprised of the abutment surface 31 and the positioning surface 32. The positioning surface 32 has a widened base portion so as to properly maintain the panel 13 in an upright vertical position.

FIG. 3 shows the configuration of the box 12 as adjoined to a second box 35. In particular, it can be seen that the first box includes back wall 17 which is affixed to the back wall 36 of second box 35. It can further be seen that the handle 21 is integrally formed with the back wall 17 of box 12. Side wall 18 extends outwardly from the back wall 17 and connects at hinge 26 with lid 23. Lid 23 has a mating configuration with the side wall 18. Lid 23 is shown in its closed position. Lid 23 has locking mechanism 29 fastened to the end surface 27 of lid 23. The locking mechanism 29 engages the receptacle 30 of handle 21. A projection 37 is provided so as to allow the user to properly manipulate the locking mechanism 29 on box 12. Similarly, box 35 includes the back wall 36, a handle 38 and a locking mechanism 39. The lid 40 of second box 35 will open outwardly about hinge 41. In conventional usage, the box 12 will contain the fisherman's lures. The box 35 may also contain a set of lures positioned on a suitable display panel or it may contain trays and other storage items. The first box 12 is joined to the second box 35 in back-to-back relationship. The back walls 17 and 36 may be joined together by bolting, sealing, adhesives, or other means.

FIG. 4 is a detailed view of the handle 21. Handle 21 is a molded handle having hand receiving opening 42 located in its center section. Opening 42 should have a size suitable for accommodating a human hand. The handle 21 is integrally formed with the back wall 17 of box 12. Special slotted openings 30 are provided adjacent to the top edge of the back wall 17. Openings 30 are interactive with the locking mechanism so as to allow the lid of the box to be properly closed and locked in position. A gripping portion 43 extends above the open area 42 of handle 21. The handle 21 also includes thicker edge portions 44 and 45 so as to enhance the structural integrity of the handle 21. In alternative embodiments, handle 21 can be adhesively fastened, bolted, or attached to the back wall 17 of box 12.

FIG. 5 shows the special configuration of the locking mechanism 29 of the present invention. It can be seen that the locking mechanism 29 comprises a roughly V-shaped member 46 which has a body portion 47 at the end of arms 48 and 49. A locking edge 50 is provided at the ends of each of the arms 48 and 49. In the intended use of locking mechanism 29, the locking edges 50 will engage the edges of the openings 30 of handle 21. An open area 51 is provided on the interior of V-shaped member 46 so as to allow the arms 48 and 49 to move with respect to each other. It can be seen that the open area 51 provides a guideway for the movable insert 52. The locking mechanism 29 is a molded plastic piece which is suitable for attachment to the lid 23 of box 12. Apertures 53 are provided so as to allow the locking mechanism 29 to be properly affixed to the end surface 27 of lid 23.

The insert element 52 has a generally flat bottom portion 54 which moves freely between the locking mechanism 29 and the end surface 27 of lid 23. Projection 55 extends upwardly from flat surface 54 through guideway 51 so as to be available for access by a human hand above the top surface of the locking mechanism 29. The movement of the insert element 52 from one end to another along guideway 51 causes the arms 48 and 49 to move with respect to each other. For example, to lock the lid 23 to &he handle 21 requires that the insert element 52 be moved in guideway 51 to end 56 of locking mechanism 29. This causes the locking edges 50 to engage the openings 30 of handle 21 thusly locking the lid 23 in proper position. To open the lid 23 requires that the person apply pressure to the projection 55 so as to cause the insert element 52 to move toward the rear 57 of guideway 51. The arms 48 and 49 will move close to one another so as to free the locking edges 50 from the openings 30 of handle 21. As such, the present invention provides a unique locking mechanism for the lure storage container 10 of the present invention.

Figure 6:
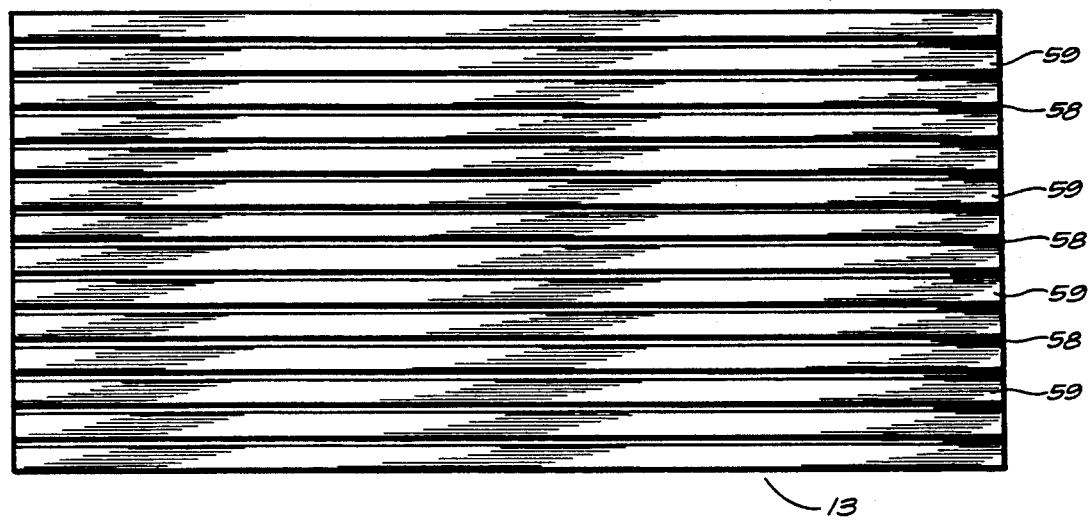
FIG. 6 is a frontal elevational view of the panel of the present invention.

FIG. 6 is an isolated view of the front face of panel 13. Panel 13 is a generally flat member of extruded plastic. Panel 13 has a plurality of horizontal slots 58 that extend across the front face of the panel. Each of the slots 58 are formed between outwardly extending T-shaped members 59. The surface of the T-shaped members 59 form a flat planar surface of the panel 13. Since panel 13 is generally flat, it can be easily inserted, in a slidable fashion, into the interior of box 12. The size of the panel 13 should be suitable for a good fit within the interior of box 12.

Figure 7:
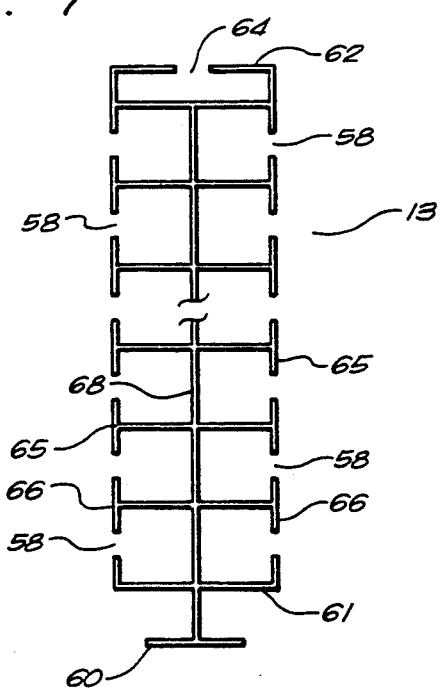
FIG. 7 is an enlarged side view of a portion of the panel of the present invention.

FIG. 7 is an illustration of an end view of the panel 13. Importantly, the panel 13 has a male connector 60 extending outwardly from edge 61 of the panel 13. On the opposite edge 62 of panel 13 is a female receiving slot 64. In use, the male member 60 can be slidably received by the female receiving slot 64. As such, each of the panels 13 can be attached in edge-to-edge relationship with another panel. In this manner, the size of each of the panels 13 can be varied as required by the fisherman.

Each of the horizontal slots 58 is comprised of a first T-shaped member 65 and a second T-shaped member 66. Each of these T-shaped members 65 and 66 are spaced from each other (so as to form the slot 58 therebetween) and are aligned parallel to each other. As can be seen, each of the T-shaped members 65 and 66 are connected, at their ends, to the central surface 68. Central surface 68 extends for the height of the panel 13. Each of the T-shaped members 65 and 66 extends outwardly from each side of the central surface 68. The T-shaped members 65 and 66, along with the central surface 68, are integrally formed together by a plastic extrusion process. As will be described hereinafter, each of the lure receiving members is fastened to the panel 13 by slidably inserting the lure receiving member into the slots 58.

Figure 8:
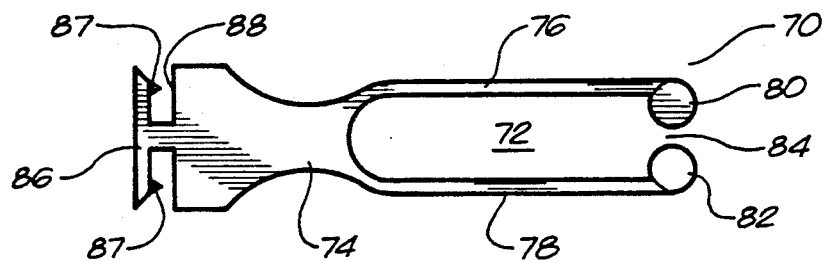
FIG. 8 is a top view of one embodiment of the clip of the present invention.

FIG. 8 illustrates one of the lure receiving members 70. The lure receiving member 70 is a clip that has a receiving area 72 for the receipt of a portion of a lure. Typically, the hooks of the lure can be inserted into the receiving area 72 such that the lure is fixed in position adjacent to the panel 13. Clip 70 comprises a body 74 having a first arm 76 and a second arm 78 extending outwardly therefrom. As can be seen in FIG. 8, the first arm 76 extends in parallel relation with the second arm 78. The are between the first arm 76 and the second arm 78 is defined as the receiving area 72. The cylindrical end members 80 and 82 extend inwardly adjacent to each other so as to define the entrance 84 into the receiving area 72. The configuration of the receiving area 72 allows for hooks to be easily received without undue manipulation of the clip 70. A T-shaped member 86 is formed at the opposite side 88 of the body 74. The T-shaped member 86 extends outwardly so as to engage the slots 58 of the panel 13. The outer edge of the T-shaped member 86 includes wear surfaces 87. Wear surfaces 87 ensure a tight fit for the clip 70 within slot 58. When the clip 70 is received by the panel 13, the T-shaped member 86 will be received within the area defined by the other T-shaped members 65 and 66 (with reference to FIG. 7). The surface 88 of the body 74 will be in abutment with the exterior surface 59 of the panel 13. In this manner, the clip 70 will be firmly positioned in a suitable slot on the panel 13.

Figure 9:
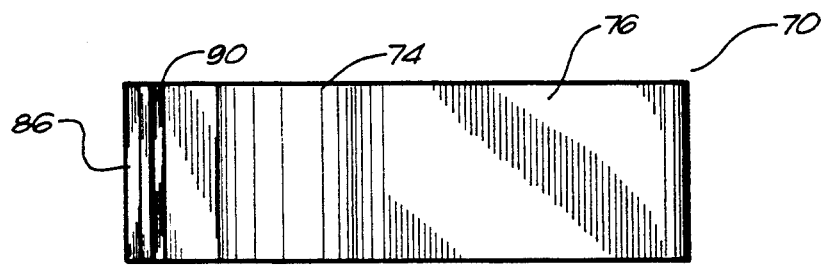
FIG. 9 is a side view of the embodiment of FIG. 8 of the clip of the present invention.

FIG. 9 illustrates a top view of the clip 70. As can be seen, the clip 70 shows the body 74 as having arm 76 extending outwardly therefrom. Also, the T-shaped member 86 extends outwardly from the other side of the body 74. Slot 90 which is a part of the T-shaped member 86 serves to slidably engage the slots of the panel.

Figure 10:
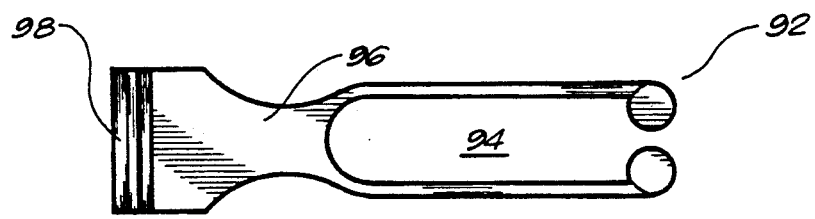
FIG. 10 is a top view of an alternative embodiment of the clip of the present invention.
Figure 11:
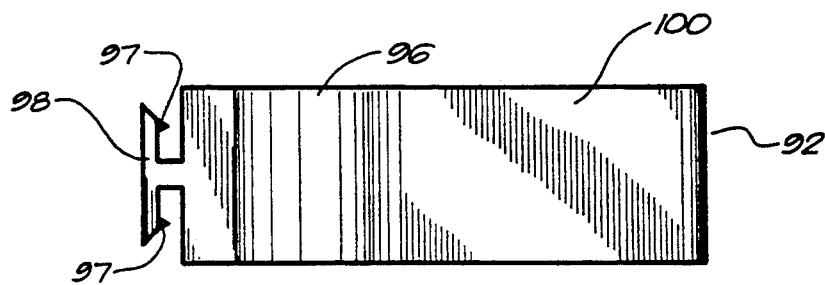
FIG. 11 is a side view of the embodiment of FIG. 10.

FIG. 10 shows an alternative embodiment 92 of the clip 70 (illustrated in FIG. 8). It is important to note that the orientation of the receiving area 72 can be manufactured in any particular direction so as to satisfy the requirements of the fisherman. Many times, the hooks of lures, and other apparatus, are more easily received by the clip 92 having the orientation illustrated in FIG. 10. Simply stated, the body 96 of clip 92 is rotated ninety degrees (90°) relative to the T-shaped member 98. FIG. 10 shows that the T-shaped member 98 is angularly offset from the body 96 and the arm 100 of clip 92. The wear surfaces 97 extend inwardly from T-shaped member 98, as shown in FIG. 11.

Although two embodiments of the clip 70 are illustrated in FIGS. 8 and 10, it should be noted that the receiving areas 72 and/or 94 can be varied as needed. Many times, it could be useful to have the receiving area in an angularly offset arrangement from the T-shaped portion. As such, the receiving areas can accommodate a wide variety of needs and requirements. In each of its embodiments, however, the T-shaped member is configured so as to properly engage the horizontal slots of the panel 13.

FIG. 12 illustrates a cushion bar 130 that can be used as an accessory in the present invention. Cushion bar 130 is a longitudinal member that has a curved surface 132. The cushion bar 130 is made of a rubberized material (or other soft material). When it is installed on the display panel 13 of the present invention, it serves the purpose of separating the lure from the surface of the display panel. The rubberized surface 132 prevents marring and abrasion from affecting the appearance of any lure that is attached to the display panel. The cushion bar 130 can be installed within the slots 58 of the display panel 13 in close proximity to any lures that are attached to the panel.

FIG. 13 illustrates the cushion bar 130. Specifically, the cushion portion 132 is an annular member having an open interior 134. The configuration of this cushion bar 130 is such that when a compressive force acts on the exterior surface of the cushion portion 132, the central area 134 will allow the cushion portion to gently depress. The cushion portion 132 is connected to T-shaped member 136. T-shaped member 136 can properly engage the horizontal slots 58 of the display panel 13.

It should be noted that in the embodiments illustrated in FIGS. 8–13, the T-shaped member is illustrated as the proper way of engaging the horizontal slots. This is not specifically intended as a limitation on the present invention. Although it is the preferred embodiment to have the accessory slidably received by the horizontal slot 58, various other configurations could also work. For example, each of the accessories can include a portion that can be snap-fitted into the slots. Alternatively, the T-shaped members can be replaced by angled half T-portions. The panel can be of a pegboard construction or can have keyed portions which engage keyed clips.

It should be noted that a spool dispenser rod can be included as an accessory to the present invention. A spool dispenser rod is a female member that can engage the top male edge of the panel. This spool dispenser rod is movable along the top male edge so as to provide an extensible surface for receiving a spool of fishing line. The spool dispenser rod can also be used so a to lock the panel in position within the vertical slots of the lure storage container.

Figure 14:
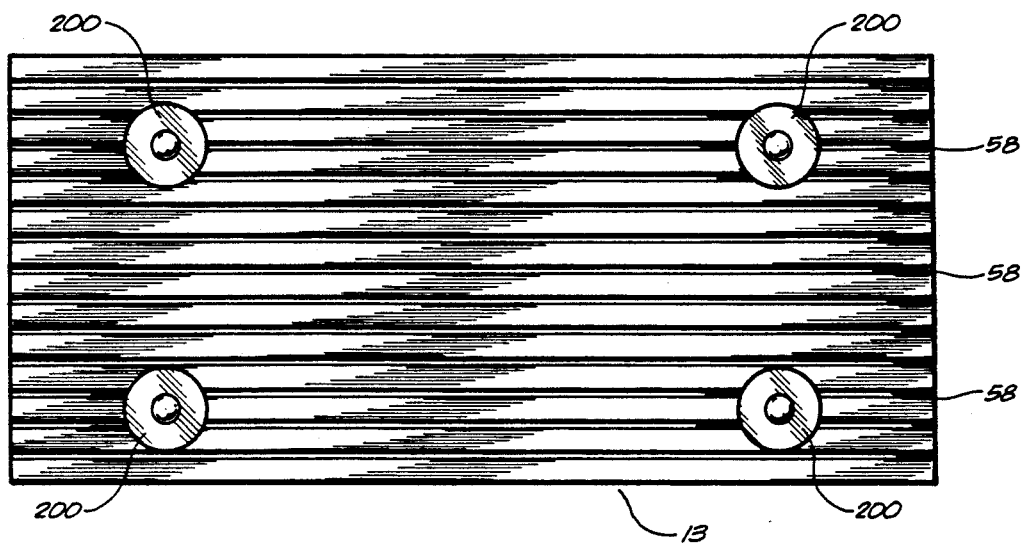
FIG. 14 is a rear elevational view of the display panel in accordance with the present invention.

FIG. 14 illustrates the back side of display panel 13. As can be seen, a plurality of suction cups 200 may be fastened within the slots 58 to the back face of the display panel 13. The suction cups 200 are arranged such that the suction side is facing away from the display panel 13. In this configuration, the display panel 13 may be affixed to a surface exterior of the box 12. It has been found that it is important to the fisherman to have the panel capable of attachment to another surface. In the configuration illustrated in FIG. 6, the display panel can be removably attached to any surface on the interior of a boat. As such, the display panel 13 allows for the display of lures in any position convenient for the fisherman. Each of the suction cups 200 may be threadedly fastened to the display panel 13 or also may be connected to the display panel 13 in the fashion described hereinbefore. For example, if each of the suction cups 200 has a T-shaped member at the back, then the suction cups 200 can be slidably mounted to the back surface of the display panel 13. In addition, various other forms of attachment mechanisms may also be included on the back face of the display panel 13. For example, sections of VELCRO (TM), mounting tape, screws, or brackets can be used so as to allow the display panel 13 to be suitably attached to another surface.

Figure 15:
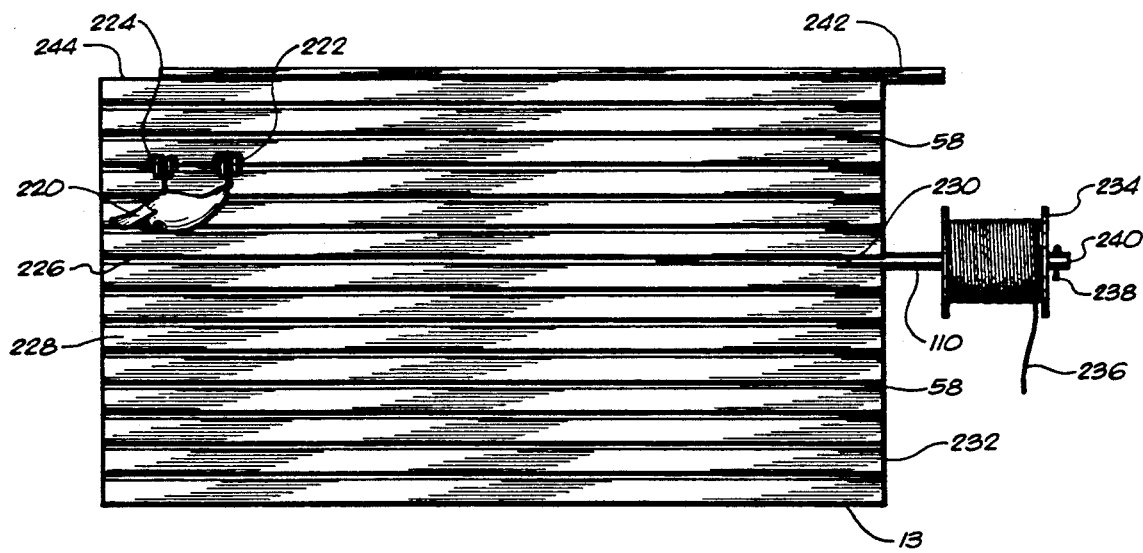
FIG. 15 is a front elevational view showing the use of the display panel of the present invention.

FIG. 15 illustrates the operation of the display panel 13. As can be seen, a fishing lure 220 is received by the clips 222 and 224. The lure 220 has its treble hooks received within the receiving area of the clips 222 and 224. The lure 220 hangs downwardly from the slot 54 which receives the lure receiving members 222 and 224. If the lure 220 were of larger size, then it would hang downwardly further. In such a situation, it would be appropriate to mount one of the cushion bars into slot 226. The cushion bar would then be able to prevent any abrasion from occurring from the contact between the body of lure 220 and the surface 228 of display panel 13.

In FIG. 15, it can also be seen that spool dispenser rod 110 is also received by slot 226. Spool dispenser rod 110 includes a portion 230 that is received by the slot 226. The spool dispenser rod 110 extends outwardly beyond the edge 232 of display panel 214. In this manner, a spool 234 can be fitted over the rod 110. The spool 234 includes fishing line 236. The spool 234 can rotate freely around the exterior surface of the rod 110. A fastener 238 can be attached to the end 240 of rod 110 so as to maintain the spool 234 in its proper position.

FIG. 15 further illustrates the use of the lock bar 242. Lock bar 242 is a member that engages the top edge 244 of panel 13. Lock bar 242 can move from side to side on the top edge 244 of display panel 13. With reference to FIG. 1, after the display panel 13 is placed in proper position within slots 15 and 20, the lock bar 242 can be moved so as to appropriately engage the slots and provide additional stability for the vertical panel 13 within the interior of box 12.

Although FIG. 1 illustrates the box 12 which is suitable for the receipt of a single vertical panel 13, it may be possible to construct the box 12 with a plurality of aligned slots for the receipt of multiple panels. With appropriate spacing, the box 12 can be sized so as to accommodate any number of vertical panels. Additionally, it should be noted that the box 12 can be configured for the receipt of single slotted members directly affixed to the backside 17 of box 12. For example, a single strip from a panel 13 can be adhesively fastened to the surface of back side 17 of box 12. As such, the box 12 can act as a "mini-box" for the fisherman who utilizes a small number of lures. The sides and the configuration of the box 12 can be varied enormously depending on the requirements of the fisherman. For example, the box 12 can be a single watertight box that can be sealed as needed.

The present invention achieves a number of advantages not found in existing lure storage systems. Most importantly, the present invention allows for the storage of crankbaits in an efficient manner. The fisherman will be easily able to pull the panels from the box so as to observe the assortment of crankbaits mounted thereon. The panel can then be attached to the box itself or to any other surface exterior of the box. This allows fishermen to have easy access to the crankbait as needed during fishing tournaments. The usage of four panels with slots on the front side and the back side of each panel allows the competitive fisherman the full assortment of seventy-two crankbaits. The manner of clipping the crankbait within the horizontal slots is an easy exercise for the fisherman. By the use of the present invention, the fisherman is no longer required to solve the complex procedure of freeing the crankbait from bondage with adjacent stored crankbait or lures.

Since the present invention is a vertical storage system, there is no concern that moisture will cause rusting of the lures. Since it is impossible to accumulate moisture on the vertical panels, there is no problem with rusty hooks or the destruction of lures by water.

The present invention also allows for the storage of plastic worms in their original bag. For example, the plastic bag may be connected around the lure receiving member so as to suspend these plastic worms in their original bag. As such, the problem of "worm melting" should not occur and, if it should occur, will not damage adjacent lures.

The present invention utilizes the cushion bar. As such, the use of the suction cup with the vertical panel of the present invention enhances the preservation of the finish on the crankbait. As a result, the life of crankbaits will be extended for a longer period of time.

The present invention is particularly appealing where accidents are likely to occur. Typical storage boxes will turn over and scatter lures and crankbaits everywhere. On the other hand, if the present invention is turned over, the crankbaits remain secured in their proper position on the panels. The present invention maintains lure organization even during jostling and spilling.

The present invention is particularly useful for the competitive fisherman. In competitive fishing, time is an extremely important factor. If the competitive fisherman is required to dig and sort through various lures in order to find the proper one, then the competitive fisherman will lose time and possibly lose prize money. On the other hand, the present invention keeps the lures in proper organization for competitive fishing activity. In order to free the crankbait from the face of the panel, a simple pulling of the crankbait allows for the removal of the crankbait. There is never a ned to untangle the lures when they are properly secured on the panel of the present invention.

Standard lure storage systems utilize horizontal drawers or unfolding drawers. These system have a typically low profile. In order to sort and examine the lures, the fisherman must stoop over in order to access such a storage system. The present invention, on the other hand, enables the fisherman to place the lures in a proper position for easy access and easy observation.

The present invention is suitable for receiving a large number of crankbaits. In traditional methods, as the inventory of lures grows, the fisherman must buy additional storage boxes. The capacity of the present invention, and its efficiency of storage, allows for the receipt of many more lures than conventional systems.

The foregoing disclosure and description of the invention is illustrative and explanatory thereof, and various changes in the details of the illustrated apparatus may be made within the scope of the appended claims without departing from the true spirit of the invention. The present invention should only be limited by the following claims and their legal equivalents.

I claim:

1. A container for fishing lures comprising:
a box having a vertical receptacle positioned therein, said box having a lid hinged to an edge of said box, said lid movable between an open and a closed position, said box having a handle formed along one surface of said box, said lid having a locking means affixed thereto, said locking means for engaging a portion of said handle when said lid is in said closed position, said handle having at least one receptacle formed therein, said locking means comprising a roughly V-shaped member affixed to a surface of said lid, said V-shaped member having a slidable insert positioned therein, said slidable insert movable within said V-shaped member so as to cause said V-shaped member to angularly expand for engagement with said receptacle of said handle;
a panel received by said vertical receptacle of said box, said panel having a plurality of slots formed therein and extending along a surface of said panel; and
lure receiving means received by at least one of said plurality of slots, said lure receiving means for detachably receiving a fishing lure.

2. The container of claim 1, said box having a rigid back surface, said container further comprising:
a second box fastened to said rigid back surface, said second box having another lid movable between an open position and a closed position.

3. The container of claim 1, said panel comprising a flat member having a front side and a back side, said panel removably contained within said box.

4. The container of claim 1, said vertical receptacle comprising:
a vertical slot formed along an inner surface of said box, said vertical slot having a first surface for abutting an edge of said panel, said vertical slot having a second surface for abutting another edge of said panel.

5. The container of claim 4, said second surface having a shorter length than said first surface, said vertical slot formed on opposite inner sides of said box.

6. The container of claim 1, said lure receiving means comprising:
a clip having a portion extending outwardly therefrom for slidably engaging one of said horizontal slots of said panel.

7. The container of claim 1, said panel having a plurality of keyed slots formed therein, said lure receiving means comprising a clip having a male portion extending outwardly therefrom, said male portion engaging said keyed slot of said panel.

8. A container for fishing lures comprising:
a box having a vertical receptacle positioned therein;
a panel received by said vertical receptacle of said box, said panel having a plurality of slots formed therein and extending along a surface of said panel, said panel comprising a flat member having a front side and a back side, said panel removably contained within said box, said panel having a male connector formed at one edge of said panel, said panel having a female receiving slot formed at an opposite edge of said panel; and
lure receiving means received by at least one of said plurality of slots, said lure receiving means for detachably receiving a fishing lure.

9. The container of claim 8, each of said slots comprising:
a first T-shaped member; and
a second T-shaped member arranged parallel to and spaced from said first T-shaped member, each of said first and second T-shaped members affixed to a center surface, said first and second T-shaped members defining a horizontal slot extending across said panel.

10. The container of claim 8, said panel further comprising:
attachment means fastened to said back side of said panel, said attachment means for affixing said panel to a surface exterior of said box.

11. A container for fishing lures comprising:
a box having a vertical receptacle positioned therein;
a panel received by said vertical receptacle of said box, said panel having a plurality of slots formed therein and extending along a surface of said panel;
lure receiving means received by at least one of said plurality of slots, said lure receiving means for detachably receiving a fishing lure, said lure receiving means comprising a clip having a portion extending outwardly therefrom for slidably engaging one of said slots of said panel, said clip comprising:
a body;
a first arm extending outwardly from one side of said body;
a second arm extending outwardly from said one side of said body, said first and second arms being in close proximity and defining a receiving area therebetween; and a T-shaped member extending outwardly from an opposite side of said body, said T-shaped member for engaging one of said plurality of horizontal slots.

12. A container for fishing lures comprising:
a box having a vertical receptacle positioned therein;
a panel received by said vertical receptacle of said box, said panel having a plurality of slots formed therein and extending along a surface of said panel;
lure receiving means received by at least one of said plurality of slots, said lure receiving means for detachably receiving a fishing lure, said lure receiving means further comprising:
   a cushion bar slidably received by one of said slots, said cushion bar having a cushion surface extending outwardly from a surface of said panel, said cushion bar for separating said lure from said surface of said panel.

13. A container for fishing lures comprising:
a box having a vertical receptacle positioned therein;
a panel received by said vertical receptacle of said box, said panel having a plurality of slots formed therein and extending along a surface of said panel;
lure receiving means received by at least one of said plurality of slots, said lure receiving means for detachably receiving a fishing lure; and
a spool dispenser rod slidably received by one of said horizontal slots, said spool dispenser rod extendable outwardly beyond an edge of said panel, said spool dispenser rod having a configuration suitable for slidably receiving a spool.

14. A fishing lure display comprising:
a panel having a plurality of horizontal slots formed therein, said panel comprising a flat member having a front side and a back side, said panel having a male connector formed at one edge of said panel, said panel having a female receiving slot formed at an opposite edge of said panel;
lure receiving means received by at least one of said plurality of horizontal slots, said lure receiving means for detachably receiving a fishing lure; and
attachment means connected to one side of said panel, said attachment means for enabling the attachment of said panel to an exterior surface.

15. The fishing lure display of claim 14, each of said plurality of horizontal slots comprising:
   a first T-shaped member;
   a second T-shaped member parallel to and spaced from said first T-shaped member, each of said first and second T-shaped members affixed to a central surface.

16. The fishing lure display of claim 14, said lure receiving means comprising:
   a clip having a portion extending outwardly therefrom for slidably engaging one of said horizontal slots of said panel.

17. The fishing lure display of claim 14, further comprising:
a box slidably connected to said panel, said box containing said panel therewithin.

18. A storage panel comprising:
a flat member having a front side and a back side, said flat member having a plurality of horizontal slots extending across said front side, each of said horizontal slots having a first T-shaped member and a second T-shaped member arranged parallel to and spaced from each other, each of said first and second T-shaped members extending outwardly perpendicular to a center surface; and
a clip having a portion extending perpendicular to said flat member, said clip engaging at least one of said horizontal slots on said front side, said clip comprising:
   a body;
   a first arm extending outwardly from one side of said body;
   a second arm extending outwardly from said one side of said body, said first and second arms being in close proximity and defining a receiving area therebetween; and
   a T-shaped member extending outwardly from an opposite side of said body, said T-shaped member engaged by said first and second T-shaped members of said horizontal slot.

19. The storage panel of claim 18, said flat member having a plurality of horizontal slots extending across said back side, each of said horizontal slots having a configuration corresponding to the configuration of said horizontal slots of said front side.

20. The storage panel of claim 18, said flat member formed of an extruded plastic material.

21. The storage panel of claim 18, said flat member having an attachment means fastened to said back side, said attachment means for affixing said flat member to an exterior surface.

22. A clip comprising:
a body;
a first arm extending outwardly from one side of said body;
a second arm extending outwardly from said one side of said body, said first and second arms being in close proximity so as to define a receiving area therebetween; and
a T-shaped member extending outwardly from an opposite side of said body, said T-shaped member for engaging an exterior surface.

23. The clip of claim 22, said first arm having a first cylindrical portion formed at an end of said first arm opposite said body, said second arm having a second cylindrical portion formed at an end of said second arm opposite said body, said first and second cylindrical portions extending inwardly adjacent each other.

24. The clip of claim 22, said T-shaped member having a wear surface extending from an outer edge of said T-shaped member.

25. The clip of claim 22, said body having a flat abutment surface, said T-shaped member extending outwardly from said abutment surface.

* * * * *